(12) United States Patent
Hansen et al.

(10) Patent No.: US 12,095,619 B2
(45) Date of Patent: Sep. 17, 2024

(54) CONFIGURATION OF NETWORKED DEVICES

(71) Applicant: ABB Schweiz AG, Baden (CH)

(72) Inventors: Ewa Hansen, Västerås (SE); Jörgen Gade, Västerås (SE); Johan Åkerberg, Västerås (SE)

(73) Assignee: ABB Schweiz AG, Baden (CH)

( * ) Notice: Subject to any disclaimer, the term of this patent is extended or adjusted under 35 U.S.C. 154(b) by 289 days.

(21) Appl. No.: 17/292,940

(22) PCT Filed: Nov. 20, 2018

(86) PCT No.: PCT/EP2018/081878
§ 371 (c)(1),
(2) Date: May 11, 2021

(87) PCT Pub. No.: WO2020/104016
PCT Pub. Date: May 28, 2020

(65) Prior Publication Data
US 2022/0006694 A1 Jan. 6, 2022

(51) Int. Cl.
*H04L 41/084* (2022.01)
*H04L 41/08* (2022.01)
(Continued)

(52) U.S. Cl.
CPC ...... *H04L 41/0843* (2013.01); *H04L 41/0806* (2013.01); *H04L 41/084* (2013.01);
(Continued)

(58) Field of Classification Search
CPC ............. H04L 41/0806; H04L 41/0816; H04L 41/0843; H04L 41/0886; H04L 41/084; H04L 41/0846
See application file for complete search history.

(56) References Cited

U.S. PATENT DOCUMENTS

| 7,352,853 B1* | 4/2008 | Shen | ..... H04Q 3/0062 |
| | | | 379/201.12 |
| 2006/0050862 A1* | 3/2006 | Shen | ..... H04L 61/5014 |
| | | | 370/352 |

(Continued)

FOREIGN PATENT DOCUMENTS

| CA | 3001801 A1 | 4/2017 |
| CN | 101014178 A | 8/2007 |

(Continued)

OTHER PUBLICATIONS

Gutierrez Marina, et al; "Self-configuration of IEEE 802.1 TSN networks"; 2017 22nd IEEE International Conference on Emerging Technologies and Factory Automation (ETFA), IEEE; Sep. 12, 2017; 8 Pages.

(Continued)

*Primary Examiner* — Gregory Todd
(74) *Attorney, Agent, or Firm* — Whitmyer IP Group LLC

(57) ABSTRACT

There is provided mechanisms for configuration of parameters for a networked device to be provisioned in a network. A method is performed by a device configuration node. The method includes obtaining a request for configuration of parameters for the networked device. The request indicates that the networked device is of a certain device type. The method includes selecting a template from a set of templates stored in a database. The template is selected based on the certain device type. The method includes providing configuration of at least a subset of the parameters for the networked device based on the template.

14 Claims, 4 Drawing Sheets

(51) Int. Cl.
*H04L 41/0806* (2022.01)
*H04L 41/0816* (2022.01)

(52) U.S. Cl.
CPC ...... *H04L 41/0846* (2013.01); *H04L 41/0816* (2013.01); *H04L 41/0886* (2013.01)

(56) References Cited

U.S. PATENT DOCUMENTS

| | | | | |
|---|---|---|---|---|
| 2007/0274285 | A1* | 11/2007 | Werber | H04L 41/0843 370/351 |
| 2015/0127792 | A1* | 5/2015 | Messinger | H04L 41/022 709/221 |
| 2015/0295759 | A1* | 10/2015 | Möllersten | H04L 41/0843 709/222 |
| 2018/0024537 | A1* | 1/2018 | Chauvet | G05B 19/41865 718/104 |
| 2018/0109533 | A1 | 4/2018 | Thubert et al. | |
| 2020/0153687 | A1* | 5/2020 | Ayyagari | H04L 41/0843 |
| 2021/0029029 | A1* | 1/2021 | Mehmedagic | H04L 63/08 |

FOREIGN PATENT DOCUMENTS

| | | |
|---|---|---|
| CN | 102810090 A | 12/2012 |
| CN | 104471896 A | 3/2015 |
| CN | 105868170 A | 8/2016 |
| WO | 2014012596 A1 | 1/2014 |
| WO | 2018015425 A1 | 1/2018 |
| WO | WO-2018024809 A1 * | 2/2018 ............. H04L 45/64 |
| WO | 2018113967 A1 | 6/2018 |

OTHER PUBLICATIONS

International Search Report and Written Opinion of the International Searching Authority; Application No. PCT/EP2018/081878; Completed: Apr. 4, 2019; Mailing Date: Apr. 15, 2019; 16 Pages.
Chinese Office Action; Application No. 201880099503.5; Issued: Jul. 29, 2023; 19 Pages.

* cited by examiner

CONFIGURATION OF NETWORKED DEVICES

TECHNICAL FIELD

Embodiments presented herein relate to a method, a device configuration node, a computer program, and a computer program product for configuration of parameters for a networked device to be provisioned in a network.

BACKGROUND

In general terms, networked devices need to be provided with some kind of configuration to function properly when deployed in the network. Currently, networked devices are configured using corresponding engineering tools, and the network configuration is mostly performed in separate network management tools. In addition, a few network related parameters are also required to be configured in the networked devices, such as communication intervals and number of retries, should a packet transmission be unsuccessful. Altogether, this is an inefficient and inconvenient workflow for the end-users, when deploying thousands of networked devices.

Time-Sensitive Networking (TSN) is an emerging standard aiming to enable Ethernet networks with real-time capabilities. TSN supports different traffic classes/priorities to coexist on the same network while guaranteeing deterministic end-to-end behavior. The mapping of the different traffic classes and priorities are done by assigning so-called VLAN tags (where VLAN is short for virtual local area network), see IEEE 802.1Q (often referred to as Dotiq) and MAC addresses (where MAC is short for media access control) to different priority queues/classes. According to an example IEEE 802.1Q adds a 32-bit field between the source MAC address and the EtherType fields of the original frame. The 32-bit field includes Tag protocol identifier (TPID), Tag control information (TCI), Priority code point (PCP), Drop eligible indicator (DEI), and VLAN identifier (VID). TSN enables support for isochronous, hard and soft realtime, audio and video and best effort traffic, to mention just a few examples.

A central part in the TSN concept is network management and network configuration. Network management and network configuration is performed by a Network Configuration that is either centralized, decentralized or a hybrid.

A Centralized Network Controller (CNC) could have the task to accommodate requests from the users and translate the requests into a configuration that meets the requirements from all users and also to deploy the configuration directly or indirectly via a Centralized User Configuration (CUC) node in the networked devices (such as switches and endpoints). Additionally or alternatively, the CUC node could be the entity that sends the request for deployment to the CNC. This implies that the networked devices need to interact with the CNC and provide information about real-time performance (period, jitter, release time, deadline, etc.), and quality-of-service parameters according to the TSN standards.

For TSN type networks (i.e., networks supporting a subset or all TSN standards), more parameters are required to be configured in the networked devices for correct performance and network utilization compared to existing technologies. In addition, different configuration parameters are required depending on what communication performance that is required for the communication flow, e.g. best-effort, deadlines, jitter, bandwidth reservation, etc. This will complicate the engineering workflow even further. These parameters are intended to be transmitted to the CNC component that will schedule and install the required network configuration as well as the network configuration for the networked devices.

Hence, there is still a need for improved network management and network configuration for networked devices.

SUMMARY

An object of embodiments herein is to provide efficient configuration of parameters for networked device.

According to a first aspect there is presented a method for configuration of parameters for a networked device to be provisioned in a network. The method is performed by a device configuration node. The method comprises obtaining a request for configuration of parameters for the networked device. The request indicates that the networked device is of a certain device type. The method comprises selecting a template from a set of templates stored in a database. The template is selected based on the certain device type. The method comprises providing configuration of at least a subset of the parameters for the networked device based on the template.

According to a second aspect there is presented a device configuration node for configuration of parameters for a networked device to be provisioned in a network. The device configuration node comprises processing circuitry. The processing circuitry is configured to cause the device configuration node to obtain a request for configuration of parameters for the networked device. The request indicates that the networked device is of a certain device type. The processing circuitry is configured to cause the device configuration node to select a template from a set of templates stored in a database. The template is selected based on the certain device type. The processing circuitry is configured to cause the device configuration node to provide configuration of at least a subset of the parameters for the networked device based on the template.

According to a third aspect there is presented a computer program for configuration of parameters for a networked device to be provisioned in a network, the computer program comprising computer program code which, when run on a device configuration node, causes the device configuration node to perform a method according to the first aspect.

According to a fourth aspect there is presented a computer program product comprising a computer program according to the third aspect and a computer readable storage medium on which the computer program is stored. The computer readable storage medium could be a non-transitory computer readable storage medium.

Advantageously this provides efficient configuration of parameters for the networked device.

Advantageously, in turn this enables efficient network management and network configuration for the networked device.

Advantageously this enables reduction of engineering work and enables faster and more efficient network management and engineering of networked control systems.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

As disclosed above, there is a need for improved network management and network configuration for networked devices. According to the herein disclosed embodiments, a device configuration node is provided for configuration of parameters for a networked device to be provisioned in a network. This enables efficient network management and network configuration.

Figure 1:
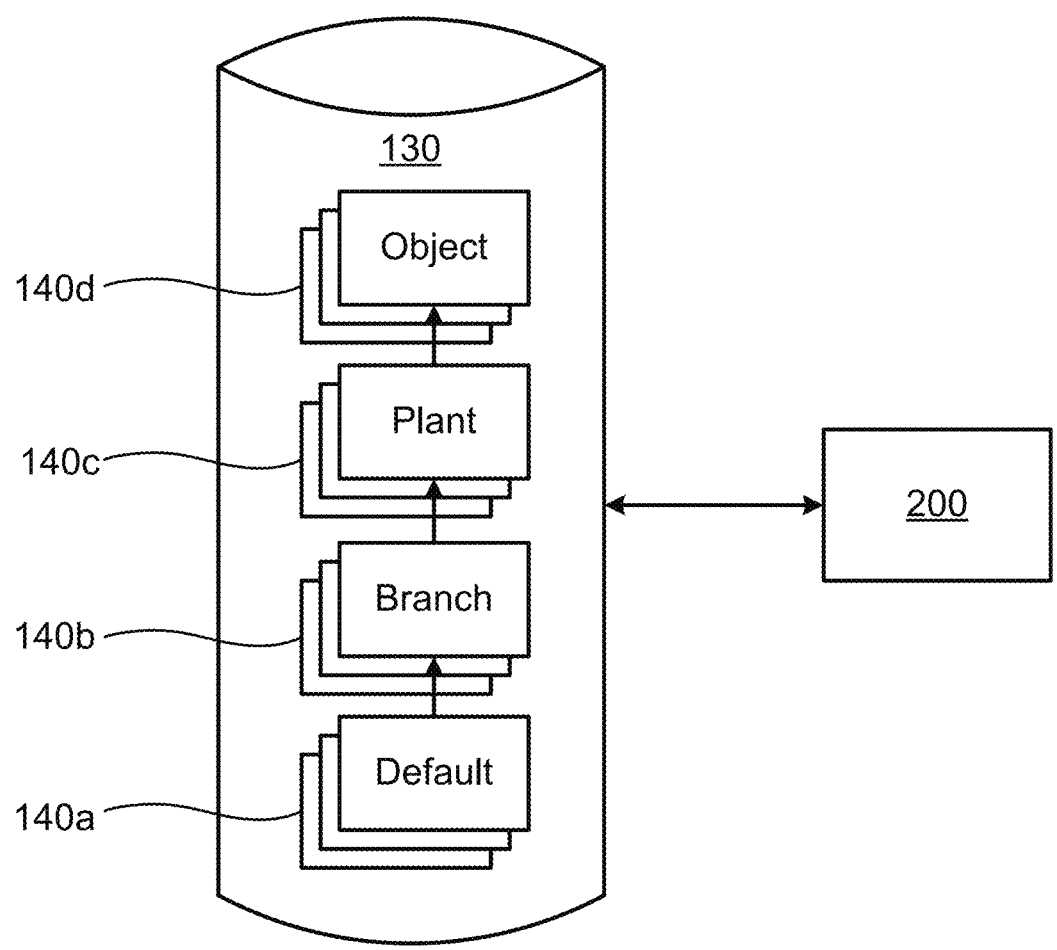
FIG. 1 is a schematic diagram illustrating a device configuration node and a database according to embodiments.

FIG. 1 schematically illustrates a device configuration node 200 and a database 130 where the database 130 stores templates 140a, 140b, 140c, 140d. On a high level of abstraction, the device configuration node 200 will communicate with the database 130 and select a template 140a, 140b, 140c, 140d for configuration of parameters for the networked device. The database 130 might be populated by templates 140a, 140b, 140c, 140d derived by networking experts and/or by templates 140a, 140b, 140c, 140d built from other templates 140a, 140b, 140c, 140d. In the example of FIG. 1, the database 130 holds one or more default templates 140a, one or more branch sector specific templates 140b, one or more plant specific templates 140c, and one or more object specific templates 140d. Examples of how the templates 140a, 140b, 140c, 140d can be used by the device configuration node 200 will be disclosed below. The database 130 might be shared between two or more device configuration nodes 200. The database 130 might thereby serve as a global template storage for one or more industrial sites, and all device configuration nodes 200 can interact with one and the same database 130 to obtain the specific templates 140a, 140b, 140c, 140d for the device type to be configured and provisioned in a network at one of the industrial sites.

Figure 2:
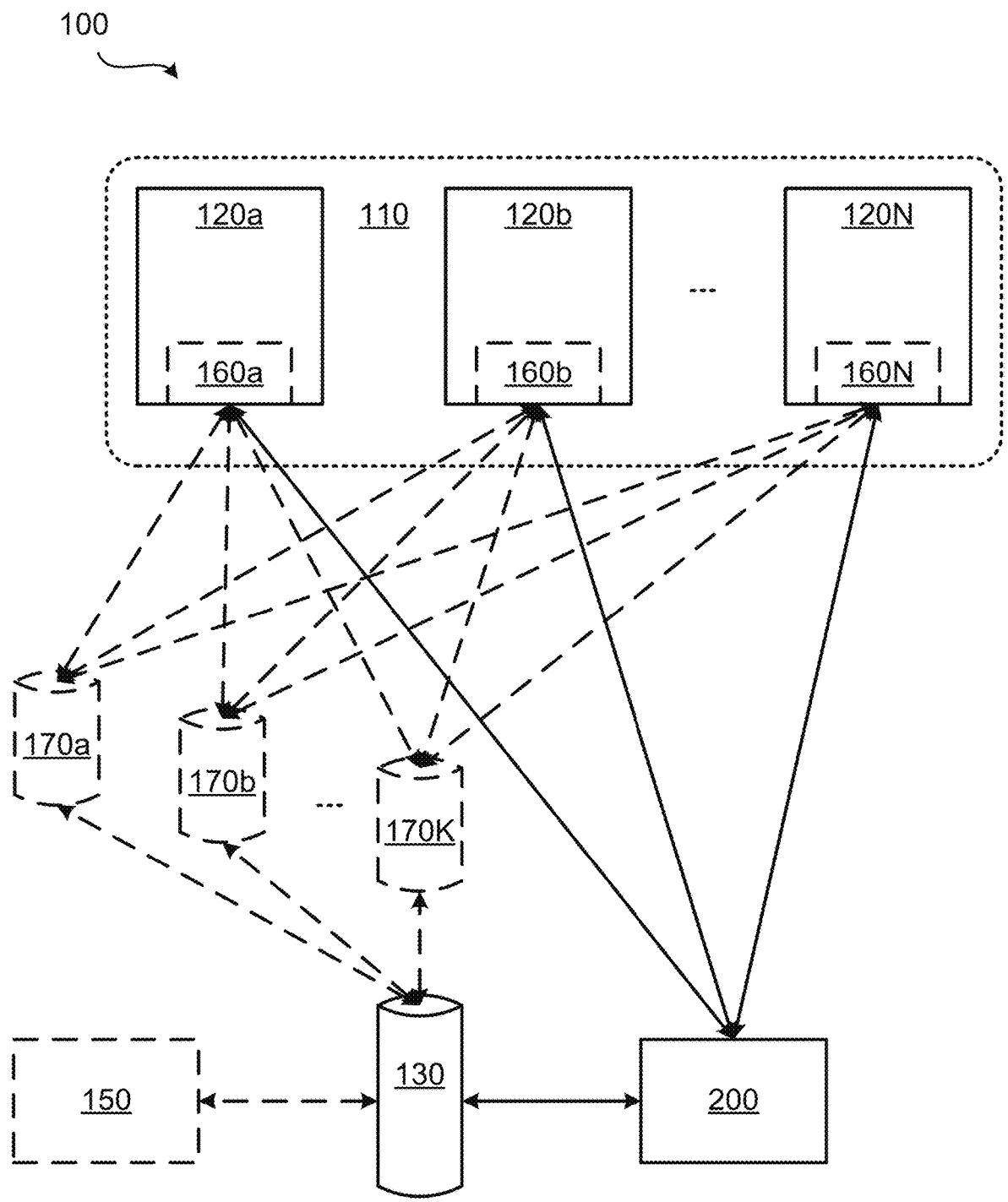
FIG. 2 is a schematic diagram illustrating a system according to embodiments.

FIG. 2 is a block diagram of a system 100 according to embodiments. In particular, FIG. 2 schematically illustrates the device configuration node 200, the database 130, and networked devices 120a, 120b, 120N in a network 110. Each networked device 120a, 120b, 120N might be part of a piece of industrial plant equipment. In some aspects the network 110 supports TSN. That is, according to an embodiment the network 110 is a time-sensitive networking, TSN, type network. The device configuration node 200 might be configured to interact with network configuration interfaces 160a, 160b, 160N of the networked device 120a, 120b, 120N to deploy the configurations.

The database 130 might be configured to interact with a machine learning and/or artificial intelligence training entity 150 to refine the templates 140a, 140b, 140c, 140d.

Further, the database 130 might be configured to interact with other servers or databases 170a, 170b, 170K in order to refine or update the templates 140a, 140b, 140c, 140d. The servers or databases 170a, 170b, 170K might be provided in a cloud computational environment. The servers or databases 170a, 170b, 170K might hold branch specific, plant specific, and/or object specific parameters and/or rules according to which the networked devices 120a, 120b, 120N are to be configured. At least some of these parameters might be based on feedback received from the networked devices 120a, 120b, 120N when operating in the network 110 such that performance for future networked devices 120a, 120b, 120N to be provisioned in the network 110 can be improved (or for those networked devices 120a, 120b, 120N that need reconfiguration of one or more parameters). The database 130 might thereby be configured to learn from observed behavior of the networked devices 120a, 120b, 120N when operating in the network 110 and from the network 110 as a whole (such as in terms of data throughput, packet scheduling, etc. pertaining to the operation of the networked devices 120a, 120b, 120N) in order to refine or update the templates 140a, 140b, 140c, 140d accordingly. Further, depending on what parameters of the networked device 120a, 120b, 120N are configured by the device configuration node 200, the networked devices 120a, 120b, 120N might interact with the servers or databases 170a, 170b, 170K for further configuration.

The embodiments disclosed herein relate to mechanisms for configuration of parameters for a networked device 120a, 120b, 120N to be provisioned in a network 110. In order to obtain such mechanisms there is provided a device configuration node 200, a method performed by the device configuration node 200, a computer program product comprising code, for example in the form of a computer program, that when run on a device configuration node 200, causes the device configuration node 200 to perform the method.

Figure 3:
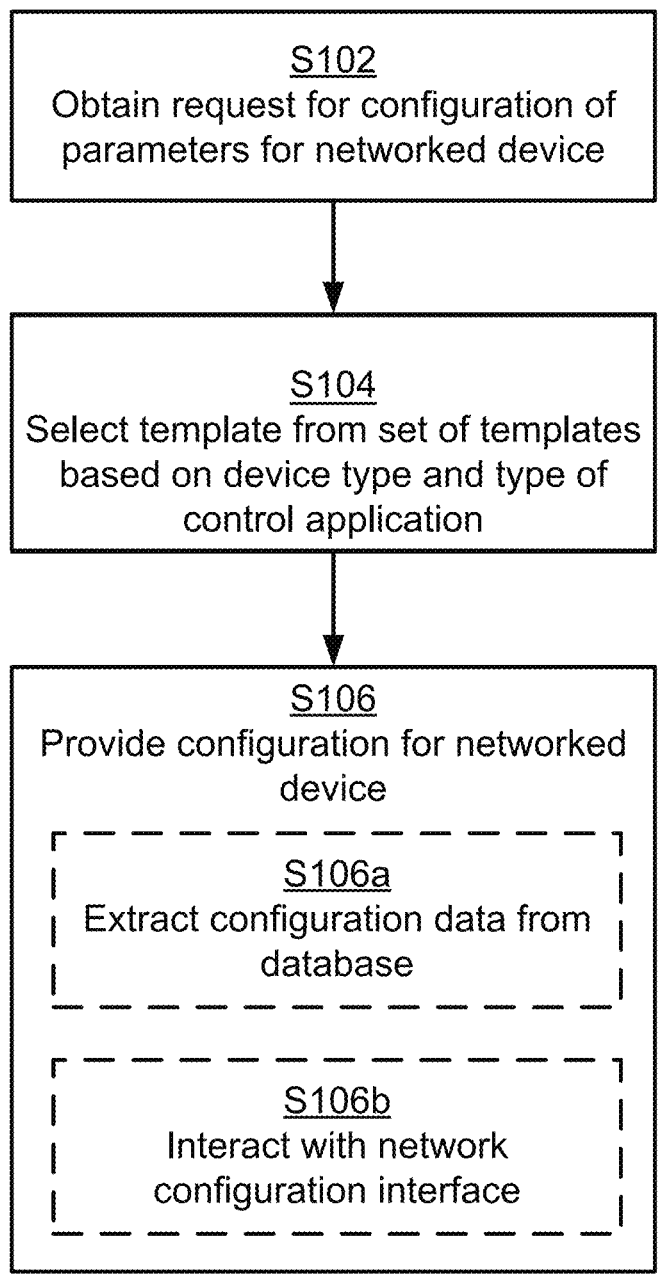
FIG. 3 is a flowchart of methods according to embodiments.

FIG. 3 is a flowchart illustrating embodiments of methods for configuration of parameters for a networked device 120a, 120b, 120N to be provisioned in a network 110.

The methods are performed by the device configuration node 200. The methods are advantageously carried out by the device configuration node 200 executing one or more computer programs 620.

It is assumed that parameters for the networked device 120a, 120b, 120N are to be configured and that the device configuration node 200 is made aware of this. Particularly, the device configuration node 200 is configured to perform step S102.

S102: The device configuration node 200 obtains a request for configuration of parameters for the networked device 120a, 120b, 120N. The request indicates that the networked device 120a, 120b, 120N is of a certain device type.

Examples of requests will be disclosed below. The device configuration node 200 interacts with the database 130 in order to provide the configuration of parameters. Particularly, the device configuration node 200 is configured to perform step S104.

S104: The device configuration node 200 selects a template 140a, 140b, 140c, 140d from a set of templates 140a, 140b, 140c, 140d stored in the database 130. The template 140a, 140b, 140c, 140d is selected based on the certain device type. The template 140a, 140b, 140c, 140d could further be selected based on other parameters, such as topology of the network 110, capacity, properties (such as throughput, capacity, speed, etc. of communication links in the network 110), capabilities of nodes (such as switches, gateways, routers, etc.) for transmitting packets between the networked device 120a, 120b, 120N in the network 110, etc.

Examples of templates 140a, 140b, 140c, 140d will be disclosed below. The thus selected template 140a, 140b, 140c, 140d is used for configuring at least some of the parameters. Particularly, the device configuration node 200 is configured to perform step S106.

S106: The device configuration node 200 provides configuration of at least a subset of the parameters for the networked device 120a, 120b, 120N based on the template 140a, 140b, 140c, 140d.

Examples of how the configuration could be provided will be disclosed below.

The device configuration node 200 thereby enables a large portion of the data needed to configure the parameters of the networked device 120a, 120b, 120N to be hidden from the user, thereby resulting in minimum interaction of the user when the networked device 120a, 120b, 120N is to be provisioned in the network 110. The device configuration node 200 thereby enables simplified configuration of parameters for the networked device 120a, 120b, 120N, thus resulting in a streamlined engineering workflow. Since configuration of parameters performed by users is error-prone, this also reduces the risk of human errors that could negatively impact the operational performance of the networked device 120a, 120b, 120N in the network 110 and possibly even result in malfunction. The device configuration node 200 might thereby be considered as providing a broker functionality.

Embodiments relating to further details of configuration of parameters for a networked device 120a, 120b, 120N to be provisioned in a network 110 as performed by the device configuration node 200 will now be disclosed.

There may be different examples of the request as obtained in step S102. As a first example the request could specify when in time the networked device 120a, 120b, 120N is to operate in the network 110. That is, according to a first embodiment, the request specifies a period of time during which the networked device 120a, 120b, 120N is to operate in the network 110. As a second example the request could specify a profile according to which the networked device 120a, 120b, 120N is to operate. That is, according to a second embodiment, the request specifies a profile to be used by the networked device 120a, 120b, 120N when operating in the network 110. In such way, a user might only specify, for example, the period time and the profile to be used for a networked device 120a, 120b, 120N to be deployed in the network 110 and the device configuration node 200 might provide the corresponding configuration of the parameters for the networked device 120a, 120b, 120N without further user interaction. Further, the configuration for the communication period and its release time and deadline might be derived from, for example, the control application or other engineering tools. As a third example the request could thus specify a control application that the networked device 120a, 120b, 120N is to perform. That is, according to a third embodiment, the request specifies a type of control application to be used by the networked device 120a, 120b, 120N when provisioned in the network 110. The template 140a, 140b, 140c, 140d is then selected based on the type of control application. The request could specify a combination of two or more of these examples and embodiments.

There may be different examples of templates 140a, 140b, 140c, 140d. In general terms, which template to select might depend on how many, and which, of the parameters for the networked device 120a, 120b, 120N that are to be configured. As a first example the template 140a, 140b, 140c, 140d could relate to configuration needed for central network management for the networked device 120a, 120b, 120N to be performed. That is, according to a first embodiment, the templates 140a, 140b, 140c, 140d pertain to parameter configurations for central network management in the network 110. The configuration for central network management might be the minimum required configuration of the parameters for the networked devices 120a, 120b, 120N that enables the networked devices 120a, 120b, 120N to, without the device configuration node 200, obtain additional configuration of the remaining parameters. Once the networked devices 120a, 120b, 120N have been provided with such central network management they might thus interact with the servers or databases 170a, 170b, 170K for further configuration.

The templates 140a, 140b, 140c, 140d might be classified with respect to process criticality such that traffic classes can be standardized and deployed without additional concerns with respect to underlying engineering. As a second example there could thus be different categories of the templates 140a, 140b, 140c, 140d. That is, according to a second embodiment, the templates 140a, 140b, 140c, 140d are categorized as default templates 140a, branch sector specific templates 140b, plant specific templates 140c, and/or object specific templates 140d.

In some aspects child templates 140b, 140c, 140d inherit properties from one or more parent templates 140a, 140b, 140c. According to a third example, existing templates 140a, 140b, 140c, 140d (e.g. acting as parent templates) are thus used to build new templates 140a, 140b, 140c, 140d (e.g., acting as child templates). That is, according to a third embodiment, new templates 140a, 140b, 140c, 140d are built based on inheritance from existing templates 140a, 140b, 140c, 140d. There could be different ways to build the new templates 140a, 140b, 140c, 140d. For example, the new templates 140a, 140b, 140c, 140d could be built based on learning from, and/or adaptation of, previously configured parameters of other networked devices 120a, 120b, 120N having been provisioned in the network 110.

With respect to the example where there could be different categories of the templates 140a, 140b, 140c, 140d, new templates 140a, 140b, 140c, 140d could be derived from any category, where properties of the existing template 140a, 140b, 140c, 140d could be specialized and/or hidden when the new templates 140a, 140b, 140c, 140d are built. New templates 140a, 140b, 140c, 140d can be build in several steps, thus enabling provide possibilities to build the branch sector specific templates 140b, plant specific templates 140a, and/or object specific templates 140d from a default template 140a that can be shared globally. Machine learning or artificial intelligence could be used when new templates 140a, 140b, 140c, 140d are built. That is, the learning from, and/or adaptation of, previously configured parameters could involve the use of machine learning or artificial intelligence. The machine learning or artificial intelligence might be provided by the machine learning and/or artificial intelligence training entity 150 with which the database 130 therefore might be configured to interact. This will enable efficient refinement and updating of the templates 140a, 140b, 140c, 140d. As disclosed above, the database 130 might interact with one or more server or database 170a, 107b, 170K to refine or update the templates 140a, 140b, 140c, 140d.

There may be different examples of how the configuration could be provided in step S106. As disclosed above, a template 140a, 140b, 140c, 140d is selected from the database 130. In some aspects the database 130 comprises configuration data that is represented by the templates 140a, 140b, 140c, 140d such that different templates 140a, 140b, 140c, 140d are associated with different subsets of the configuration data. Particularly, according to an embodiment the device configuration node 200 is configured to perform (optional) step S106a as part of step S106.

S106a: The device configuration node 200 extracts configuration data from the database 130. The configuration data is represented by the selected template 140a, 140b, 140c, 140d.

The configuration data is then provided to the networked device 120a, 120b, 120N. Particularly, according to an embodiment the device configuration node 200 is configured to perform (optional) step S106b as part of step S106.

S106b: The device configuration node 200 interacts with a network configuration interface 160a, 160b, 160N of the networked device 120a, 120b, 120N in order to provide the networked device 120a, 120b, 120N with the thus configured parameters.

Figure 4:
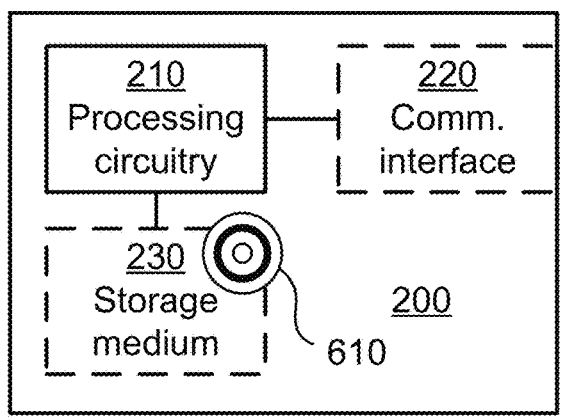
FIG. 4 is a schematic diagram showing functional units of a device configuration node according to an embodiment.

FIG. 4 schematically illustrates, in terms of a number of functional units, the components of a device configuration node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 610 (as in FIG. 6), e.g. in the form of a storage medium 230. The processing circuitry 210 may further be provided as at least one application specific integrated circuit (ASIC), or field programmable gate array (FPGA).

Particularly, the processing circuitry 210 is configured to cause the device configuration node 200 to perform a set of operations, or steps, as disclosed above. For example, the storage medium 230 may store the set of operations, and the processing circuitry 210 may be configured to retrieve the set of operations from the storage medium 230 to cause the device configuration node 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The device configuration node 200 may further comprise a communications interface 220 at least configured for communications with other entities, functions, nodes, and devices in the system 100, such as at least the database 130 and the networked devices 120a, 120b, 120N. As such the communications interface 220 may comprise one or more transmitters and receivers, comprising analogue and digital components. The processing circuitry 210 controls the general operation of the device configuration node 200 e.g. by sending data and control signals to the communications interface 220 and the storage medium 230, by receiving data and reports from the communications interface 220, and by retrieving data and instructions from the storage medium 230. Other components, as well as the related functionality, of the device configuration node 200 are omitted in order not to obscure the concepts presented herein.

Figure 5:
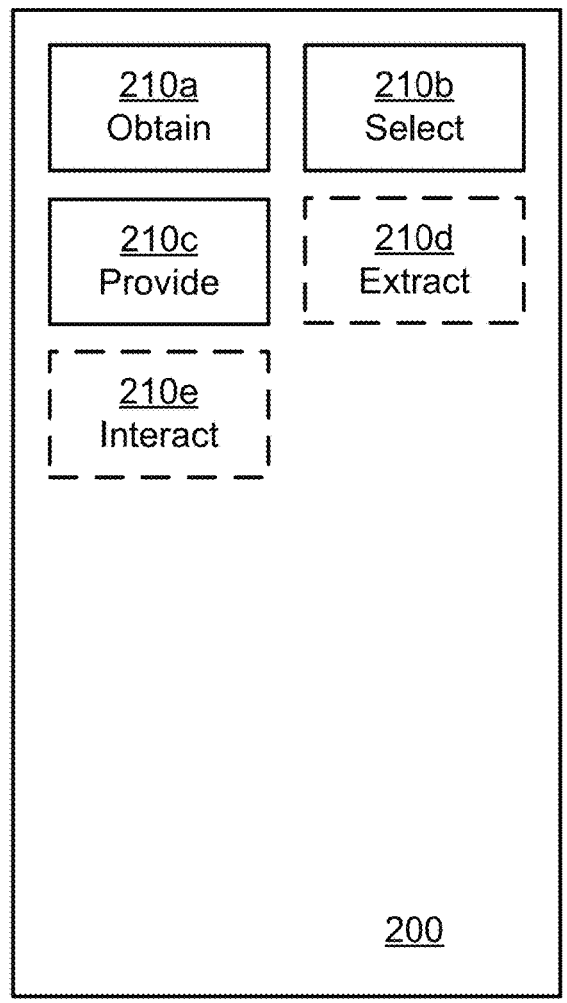
FIG. 5 is a schematic diagram showing functional modules of a device configuration node according to an embodiment.

FIG. 5 schematically illustrates, in terms of a number of functional modules, the components of a device configuration node 200 according to an embodiment. The device configuration node 200 of FIG. 5 comprises a number of functional modules; an obtain module 210a configured to perform step S102, a select module 210b configured to perform step S104, and a provide module 210c configured to perform step S106. The device configuration node 200 of FIG. 5 may further comprise a number of optional functional modules, such as any of an extract module 210d configured to perform step S106a and an interact module 210e configured to perform step S106b. In general terms, each functional module 210a-210e may in one embodiment be implemented only in hardware and in another embodiment with the help of software, i.e., the latter embodiment having computer program instructions stored on the storage medium 230 which when run on the processing circuitry makes the device configuration node 200 perform the corresponding steps mentioned above in conjunction with FIG. 5. It should also be mentioned that even though the modules correspond to parts of a computer program, they do not need to be separate modules therein, but the way in which they are implemented in software is dependent on the programming language used. Preferably, one or more or all functional modules 210a-210e may be implemented by the processing circuitry 210, possibly in cooperation with the communications interface 220 and/or the storage medium 230. The processing circuitry 210 may thus be configured to from the storage medium 230 fetch instructions as provided by a functional module 210a-210e and to execute these instructions, thereby performing any steps as disclosed herein.

The device configuration node 200 may be provided as a standalone device or as a part of at least one further device. Thus, a first portion of the instructions performed by the device configuration node 200 may be executed in a first device, and a second portion of the of the instructions performed by the device configuration node 200 may be executed in a second device; the herein disclosed embodiments are not limited to any particular number of devices on which the instructions performed by the device configuration node 200 may be executed. Hence, the methods according to the herein disclosed embodiments are suitable to be performed by a device configuration node 200 residing in a cloud computational environment. Therefore, although a single processing circuitry 210 is illustrated in FIG. 4 the processing circuitry 210 may be distributed among a plurality of devices, or nodes. The same applies to the functional modules 210a-210e of FIG. 5 and the computer program 620 of FIG. 6.

Figure 6:
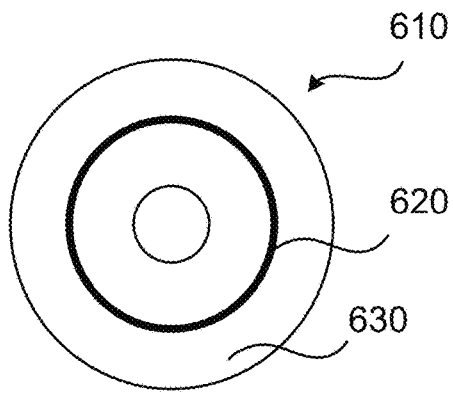
FIG. 6 shows one example of a computer program product comprising computer readable storage medium according to an embodiment.

FIG. 6 shows one example of a computer program product 610 comprising computer readable storage medium 630. On this computer readable storage medium 630, a computer program 620 can be stored, which computer program 620 can cause the processing circuitry 210 and thereto operatively coupled entities and devices, such as the communications interface 220 and the storage medium 230, to execute methods according to embodiments described herein. The computer program 620 and/or computer program product 610 may thus provide means for performing any steps as herein disclosed.

In the example of FIG. 6, the computer program product 610 is illustrated as an optical disc, such as a CD (compact disc) or a DVD (digital versatile disc) or a Blu-Ray disc. The computer program product 610 could also be embodied as a memory, such as a random-access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 620 is here schematically shown as a track on the depicted optical disk, the computer program 620 can be stored in any way which is suitable for the computer program product 610.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for configuration of parameters for a networked device to be provisioned in a network, the method being performed by a device configuration node, the method comprising:
    obtaining a request for configuration of parameters for the networked device, wherein the request indicates that the networked device is of a certain device type, and wherein the networked device is part of a piece of industrial plant equipment;
    selecting a template from a set of templates stored in a database, wherein the template is selected based on the certain device type, wherein the request specifies a type of control application to be used by the networked device when provisioned in the network, and wherein the template is selected based on the type of control application; and
    providing configuration of at least a subset of the parameters for the networked device based on the template.

2. The method according to claim 1, wherein the network is a time-sensitive networking, TSN, type network.

3. The method according to claim 1, wherein the templates pertain to parameter configurations for central network management in the network.

4. The method according to claim 1, wherein providing the configuration further comprises:
    extracting configuration data from the database, the configuration data being represented by the selected template.

5. The method according to claim 1, wherein providing the configuration further comprises:
    interacting with a network configuration interface of the networked device in order to provide the networked device with the configured parameters.

6. The method according to claim 1, wherein the request specifies a period of time during which the networked device is to operate in the network.

7. The method according to claim 1, wherein the request specifies a profile to be used by the networked device when operating in the network.

8. The method according to claim 1, wherein the templates are categorized as default templates, branch sector specific templates, plant specific templates, and/or object specific templates.

9. The method according to claim 1, wherein new templates are built based on inheritance from existing templates.

10. The method according to claim 9, wherein the new templates are built based on learning from, and/or adaptation of, previously configured parameters of other networked devices having been provisioned in the network.

11. The method according to claim 10, wherein the learning from, and/or adaptation of, previously configured parameters involve the use of machine learning or artificial intelligence.

12. A device configuration node for configuration of parameters for a networked device to be provisioned in a network, the device configuration node comprising processing circuitry, the processing circuitry being configured to cause the device configuration node to:
    obtain a request for configuration of parameters for the networked device, wherein the request indicates that the networked device is of a certain device type, and wherein the networked device is part of a piece of industrial plant equipment;
    select a template from a set of templates stored in a database, wherein the template is selected based on the certain device type, wherein the request specifies a type of control application to be used by the networked device when provisioned in the network, and wherein the template is selected based on the type of control application; and
    provide configuration of at least a subset of the parameters for the networked device based on the template.

13. The device configuration node according to claim 12, wherein the network is a time-sensitive networking, TSN, type network.

14. A non-transitory computer-readable storage medium storing a computer program for configuration of parameters for a networked device to be provisioned in a network, the computer program comprising computer code which, when run on processing circuitry of a device configuration node, causes the device configuration node to:
    obtain a request for configuration of parameters for the networked device, wherein the request indicates that the networked device is of a certain device type, and wherein the networked device is part of a piece of industrial plant equipment;
    select a template from a set of templates stored in a database, wherein the template is selected based on the certain device type, wherein the request specifies a type of control application to be used by the networked device when provisioned in the network, and wherein the template is selected based on the type of control application; and
    provide configuration of at least a subset of the parameters for the networked device based on the template.

* * * * *